Patented Aug. 23, 1932

1,873,401

UNITED STATES PATENT OFFICE

HEINRICH HEIMANN, OF DESSAU IN ANHALT, GERMANY, ASSIGNOR TO I. G. FARBENINDUSTRIE AKTIENGESELLSCHAFT, OF FRANKFORT-ON-THE-MAIN, A CORPORATION OF GERMANY

THE PREPARATION OF A NON-HYGROSCOPIC MIXED FERTILIZER

No Drawing. Application filed May 10, 1928, Serial No. 276,816, and in Germany July 29, 1927.

This invention relates to a new process of manufacturing a non-hygroscopic mixed fertilizer and is based on the observation that a mixed fertilizer may be prepared by causing ammonium nitrate and a mixture of sodium chloride and potassium chloride to react with one another in aqueous solution and by separating the mixture of the reaction products thus obtained from the liquor. As mixture of sodium chloride with potassium chloride the commercial fertilizing salts comprising potassium chloride in admixture with common salt. The content of potassium chloride in the said raw salts corresponds to about 50 or more per cent of $K_2O$. The new process has the advantages over the hitherto known methods of preparing mixed fertilizers that the ammonium nitrate is almost completely converted and that the resulting fertilizer does no longer harden. Furthermore, it is distinguished by its heat balance inasmuch as the heating and cooling operations are reduced to a minimum. The following example illustrates the invention without limiting it:—

*Example.*—1 cubic meter of water is mixed whilst stirring with 850 kg. of commercial potassium chloride containing potassium chloride in an amount corresponding to 50 to 52 per cent. $K_2O$ and 1200 kg. of ammonium nitrate for 2 hours at about 20° C. The solution is separated from the undissolved salt mixture and stirred with 200 kg. of a hot ammonium nitrate solution containing 90 per cent. of nitrate and of a temperature of 90–100° C. and 170 kg. of ground raw commercial potassium chloride until the potassium chloride has been converted. After about 2 hours there are obtained by separating in the known manner, for instance by filtration or centrifuging from the mother liquor having a temperature of 20–30° C. 350 kg. of the mixed salt consisting of ammonium chloride, potassium nitrate, sodium nitrate and a small quantity of ammonium nitrate, and containing about 17 per cent. of nitrogen and potassium amounting to 27 per cent calculated as $K_2O$.

By adding ammonium chloride the nitrogen content can be increased and the potassium content reduced. In the mother liquor thus obtained the above mentioned reaction can repeatedly be carried out, since it contains in the same proportion all constituents of the solution previously prepared when starting the process. The products may be dried in the usual manner.

What I claim is:—

1. A process of manufacturing a mixed fertilizer which comprises introducing into an aqueous solution saturated at ordinary temperature with potassium chloride and ammonium nitrate a further quantity of a hot concentrated solution of ammonium nitrate and solid potassium chloride, allowing the mixture to regain about room temperature, separating the solid magma of reaction products from the mother liquor, drying the former and using the latter for a further operation.

2. A process of manufacturing a mixed fertilizer which comprises introducing into an aqueous solution saturated at ordinary temperature with commercial potassium chloride fertilizing salt and ammonium nitrate a further quantity of a hot concentrated solution of ammonium nitrate and solid commercial potassium chloride fertilizing salt, allowing the mixture to regain about room temperature, separating the solid magma of reaction products from the mother liquor, drying the former and using the latter for a further operation.

3. A process of manufacturing a mixed fertilizer which comprises saturating at ordinary temperature 1000 parts of water with ammonium nitrate and commercial potassium chloride, containing potassium chloride in an amount corresponding to 50 to 52% of $K_2O$, introducing while stirring in said saturated solution 170 parts of ground potassium chloride and 200 parts of an ammonium nitrate solution containing 90% of nitrate and having a temperature of about 90 to 100° C., allowing the mixture to regain a temperature of about 20 to 30° C., separating the said magma of reaction products from the mother liquor, drying the former and using the latter again for a further operation.

In testimony whereof, I affix my signature.
HEINRICH HEIMANN.